US009173352B1

(12) United States Patent
Moreland

(10) Patent No.: US 9,173,352 B1
(45) Date of Patent: Nov. 3, 2015

(54) MODULAR ENCLOSURE FOR GARDENING AND STORAGE

(71) Applicant: Tony Ray Moreland, San Antonio, TX (US)

(72) Inventor: Tony Ray Moreland, San Antonio, TX (US)

(*) Notice: Subject to any disclaimer, the term of this patent is extended or adjusted under 35 U.S.C. 154(b) by 137 days.

(21) Appl. No.: 13/922,018

(22) Filed: Jun. 19, 2013

Related U.S. Application Data

(60) Provisional application No. 61/662,297, filed on Jun. 20, 2012.

(51) Int. Cl.
A01G 9/00 (2006.01)
A01K 1/00 (2006.01)
E05C 19/00 (2006.01)

(52) U.S. Cl.
CPC ... *A01G 9/00* (2013.01); *A01K 1/00* (2013.01); *E05C 19/00* (2013.01)

(58) Field of Classification Search
CPC ......... A01G 9/1423; A01G 9/02; A01G 9/10; A01G 9/14; A01G 9/1476; A01G 9/16; A01G 1/04; A01G 1/042; A01G 1/007; A01G 9/00; Y02B 80/32; A01K 1/00; E05C 19/00
See application file for complete search history.

(56) References Cited

U.S. PATENT DOCUMENTS

| | | | | |
|---|---|---|---|---|
| 95,255 A * | 9/1869 | Osborn | | 47/18 |
| 159,346 A * | 2/1875 | Musgrove | | 47/17 |
| 869,523 A * | 10/1907 | Schmidt | | 47/66.6 |
| 1,347,397 A * | 7/1920 | Newman | | 119/474 |
| RE30,657 E * | 6/1981 | Mason et al. | | 47/79 |
| 6,393,764 B1 * | 5/2002 | Smith | | 47/65.5 |
| 7,748,162 B1 * | 7/2010 | Necessary et al. | | 47/17 |
| 8,453,379 B1 * | 6/2013 | Kumar | | 47/66.6 |
| 2013/0264921 A1 * | 10/2013 | Kumar | | 312/235.5 |
| 2014/0026474 A1 * | 1/2014 | Kulas | | 47/1.7 |
| 2014/0047765 A1 * | 2/2014 | Wescott et al. | | 47/17 |
| 2014/0190077 A1 * | 7/2014 | Burmann | | 47/66.1 |

FOREIGN PATENT DOCUMENTS

| | | | | |
|---|---|---|---|---|
| FR | 2979182 A1 * | 3/2013 | | A01G 9/16 |
| JP | 3139768 U * | 2/2008 | | A01G 9/16 |
| WO | WO 2009146701 A1 * | 12/2009 | | A01G 9/16 |
| WO | WO 2012151754 A1 * | 11/2012 | | A01G 9/16 |

OTHER PUBLICATIONS

Machine translation of JP 3139768 to Chen, published Feb. 2008.*
Machine translation of FR 2979182 to Helias, published Mar. 2013.*

* cited by examiner

*Primary Examiner* — Kathleen Alker
(74) *Attorney, Agent, or Firm* — Plager Schack LLP

(57) ABSTRACT

A modular enclosure both permits gardening and accommodates secure storage. The modular enclosure includes a raised gardening bed capable of accommodating a pot, a container or a box which can be used to grow a plant or fungus without requiring a user to bend over to access the pot, the container or the box. The secure storage mechanically coupled to the raised gardening bed requires a physical test for the user to access the secure storage. A drip edge immediately adjacent to the raised gardening bed permits water to drain from the raised gardening bed.

16 Claims, 6 Drawing Sheets

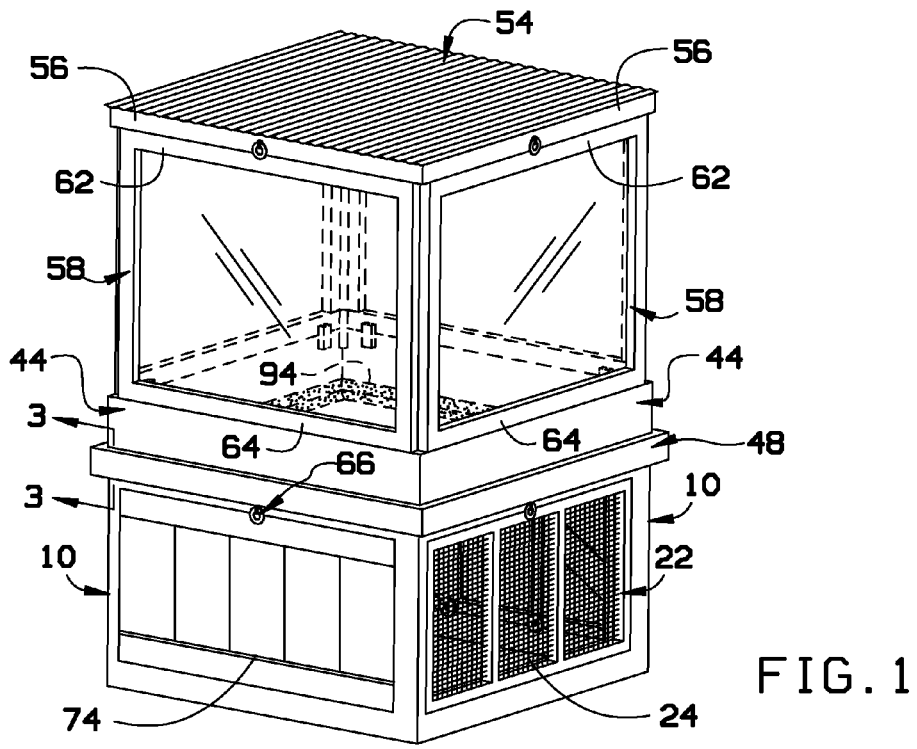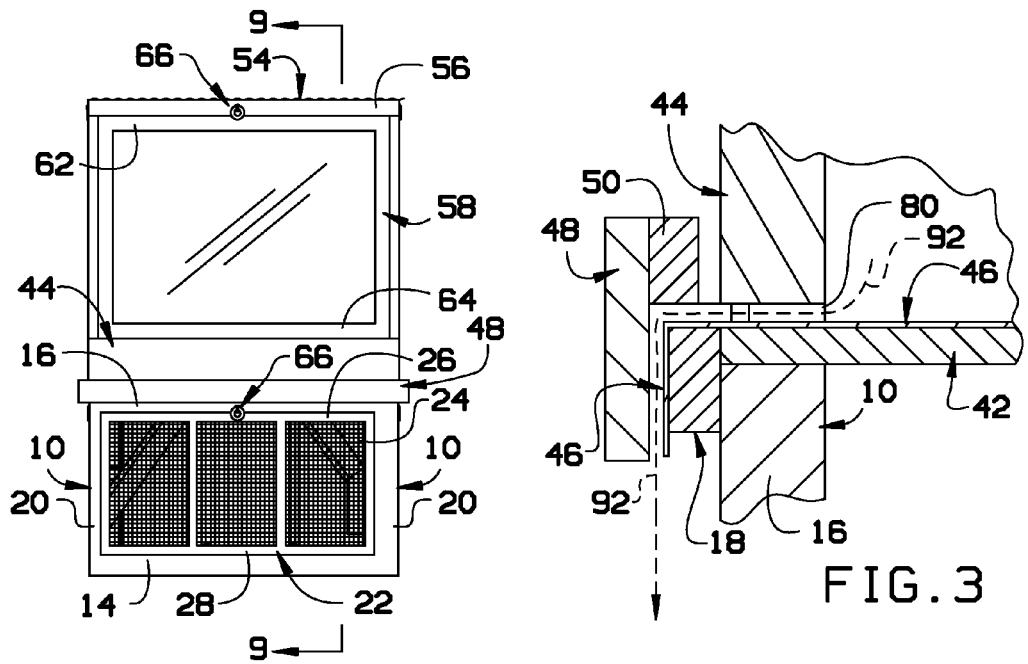
FIG. 1
FIG. 2
FIG. 3

MODULAR ENCLOSURE FOR GARDENING AND STORAGE

RELATED APPLICATION

This application claims priority to provisional patent application U.S. Ser. No. 61/662,297 filed on Jun. 20, 2012, the entire contents of which is herein incorporated by reference.

BACKGROUND

The embodiments herein relate generally to devices that can be used for gardening and animal husbandry.

There is a movement in the United States of America and elsewhere for individuals to grow their own crops and raise their own animals in suburban and urban settings. The difficulty is that most research on gardening and animal husbandry focuses on techniques that are more applicable to rural settings. Embodiments of the present invention explore and solve this problem by teaching techniques to efficiently use space to grow crops, store materials and raise animals.

SUMMARY

A modular enclosure both permits gardening and accommodates secure storage. The modular enclosure includes a raised gardening bed capable of accommodating a pot, a container or a box which can be used to grow a plant or fungus without requiring a user to bend over to access the pot, the container or the box. The secure storage is mechanically coupled to the raised gardening bed. The raised gardening bed requires a physical test for the user to access the secure storage. A drip edge immediately adjacent to the raised gardening bed which permits water to drain from the raised gardening bed. In some embodiments, the drip edge can allow water to drain from one side, many sides or all sides depending on location and user preference.

In some embodiments, the raised gardening bed further comprises an enclosure frame further comprising four lower frame bars arranged in a rectangle and mechanically coupled to four inside legs and four outside legs; the four inside legs and the four outside legs are further mechanically coupled to four upper frame bars. The enclosure frame is mechanically coupled to a ledge that extends past the four upper frame bars. A waterproof membrane is placed upon the ledge in order to channel the water from the waterproof membrane off of the ledge. A spacer is immediately adjacent to the waterproof membrane. The drip edge is immediately adjacent to the spacer. The drip edge further comprises four rails mechanically coupled to one another forming a rectangle. Each rail is further mechanically coupled to a four drip edge inner rails such that the water can flow past the spacer and is then directed downward by the drip edge. A soil retainer is placed on top of the spacer to prevent soil from flowing past the drip edge.

In some embodiments, side panels are immediately adjacent to the enclosure frame wherein the side panels further comprise a side panel upper bar mechanically coupled to side panel vertical members. The side panel vertical members are further mechanically coupled to a side panel lower bar. The side panel lower bar is mechanically coupled to a panel stop which prohibits movement of the side panel in one direction from the enclosure frame.

In some embodiments, the physical test is created by a gravity latch. The gravity latch further comprises a pivot plate mechanically coupled to a finger ring with a fastener. The gravity latch requires the physical test to move the finger ring away from the side panel upper bar by rotating the finger ring. The physical test can prevent animals without dexterity to accomplish the physical test from entering the secured storage thus securing the secured storage.

In some embodiments the raised gardening bed is attached to an upper compartment. The upper compartment further comprises a pole frame further comprising a rectangle created by four connected members resulting in four corners. Each corner is mechanically coupled to a member orthogonal to the rectangle. The orthogonal members are immediately adjacent to the soil retainer. The pole frame is further connected truss members wherein the truss members are mechanically coupled to a cover frame such that the truss members and the cover frame can channel the water away from the cover frame and onto the drip edge.

In some embodiments, a user can create a greenhouse to grow plants and house animals. The greenhouse keeps the plants warm and the animals cool. The greenhouse comprises at least two raised gardening beds arranged into parallel rows. Each raised gardening bed further comprises an enclosure frame further comprising four lower frame bars arranged in a rectangle and mechanically coupled to four inside legs and four outside legs. The four inside legs and the four outside legs are further mechanically coupled to four upper frame bars. Each enclosure frame is mechanically coupled to a ledge that extends past the four upper frame bars. A waterproof membrane is placed upon the ledge in order to channel water from the waterproof membrane off of the ledge. A spacer is immediately adjacent to the waterproof membrane. A drip edge is immediately adjacent to the spacer, the drip edge is further comprising four rails mechanically coupled to one another forming a rectangle. Each rail is further mechanically coupled to a four drip edge inner rails such that the water can flow past the spacer and is then directed downward by the drip edge. A soil retainer is placed on top of the spacer to prevent soil from flowing past the drip edge. Side panels are immediately adjacent to each enclosure frame wherein the side panels further comprise a side panel upper bar mechanically coupled to side panel vertical members.

The side panel vertical members are further mechanically coupled to a side panel lower bar. The side panel lower bar is mechanically coupled to a panel stop which prohibits movement of the side panel in one direction from the enclosure frame. Outward facing side panels are wire mesh permitting air to flow through the side panels and to cool animals therein. Inward facing sides are solid panels in order to keep heat from leaving the greenhouse through the side panels.

A pole frame on top of the raised gardening beds forms a truss structure and a series of upper panels. The upper panels can be greenhouse glazing to keep the heat inside the greenhouse to encourage plant growth. A door is mechanically coupled to the pole frame to permit entry to the greenhouse.

BRIEF DESCRIPTION OF THE FIGURES

The detailed description of some embodiments of the invention is made below with reference to the accompanying figures, wherein like numerals represent corresponding parts of the figures.

FIG. 1 is a perspective view of an embodiment of the invention.

FIG. 2 is a side view of an embodiment of the invention.

FIG. 3 is a detail section view of an embodiment of the invention along line 3-3 in FIG. 1.

DETAILED DESCRIPTION OF CERTAIN EMBODIMENTS

By way of example, and referring to FIG. 1, one embodiment of a modular enclosure comprises enclosure frame 10 detachably coupled to a plurality of side panels 22 wherein the top of the enclosure frame further comprises a surface that can be used to grow crops such as plants or fungi. In some embodiments, the surface can be part of a standing planter box or a greenhouse bench. In other embodiments the surface can be enclosure frame 10. The enclosure frame can be mechanically coupled to a greenhouse enclosure to further assist in growing crops.

Figure 8:
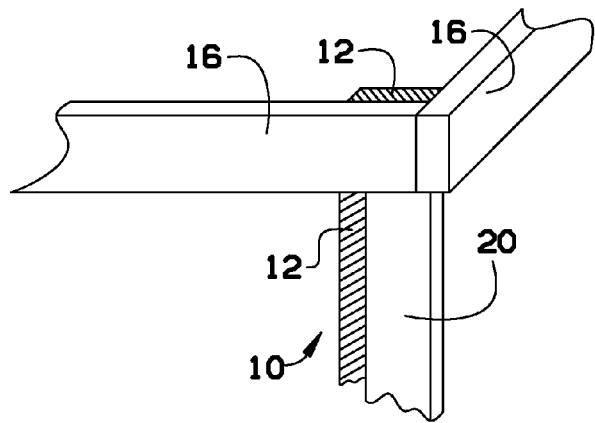
FIG. 8 is a perspective detail view of an embodiment of the invention.
Figure 11:
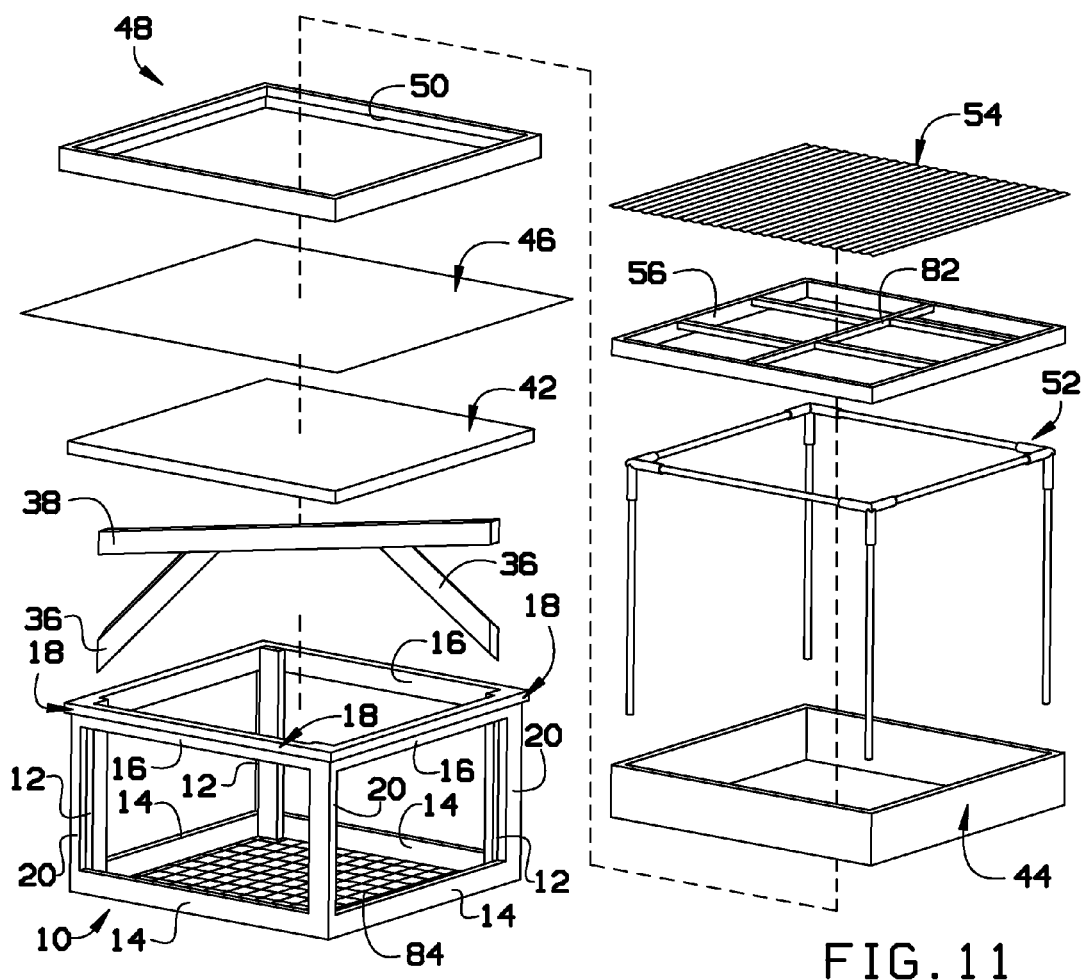
FIG. 11 is an exploded view of an embodiment of the primary components of structure.

Turning to FIG. 11, enclosure frame 10 comprises four lower frame bars 14 arranged in a rectangle and mechanically coupled to four inside legs 12 and four outside legs 20. A set of frame bars 14, inside legs 12 and outside legs 20 that do not move form a fixed plane. Turning to FIG. 8, inside legs 12 should extend beyond outside legs 20 in order to accommodate panels as explained below. Inside legs 12 and outside legs 20 are further mechanically coupled to four upper frame bars 16. The four upper frame bars 16 are arranged in a rectangle substantially like the four lower frame bars 14, but are separated in height.

In some embodiments, hardwire floor 84 can be mechanically coupled to inside legs 12, outside legs 20, and the four lower frame bars 14 to form a floor and prevent vermin from burrowing into the secure storage area. In some embodiments, a user can add a cross member support structure comprising upper cross beam deck support 38 mechanically coupled to a first diagonal interior support 36 and a second diagonal interior support 36. The cross member support can connect four of the eight corners of enclosure frame 10 to distribute the weight of roof deck 42 and whatever is on roof deck 42 onto inside legs 12 and outside legs 20.

Turning to FIG. 3, the four upper frame bars 16 are mechanically coupled to roof deck 42. An outer edge of both roof deck 42 and upper frame bars 16 are mechanically coupled to four standoff strips 18 effectively forming a ledge. In alternate embodiments, the ledge could simply be a roof deck that extends past the four upper frame bars 16. Roof deck 42 and the ledge are covered with waterproof membrane 46. Waterproof membrane 46 can be flat or slightly convex, but not concave to avoid allowing water to pool on top of waterproof membrane 46. Spacer 80 rests on top of waterproof membrane 46. Spacer 80 can be thin, perhaps only 3.5 millimeters, but should be sufficiently large that water 92 can flow over and off waterproof membrane 46, but that soil cannot fall from waterproof membrane 46. In some embodiments this is assisted by soil filter 94 as shown in FIG. 1.

With regard to flowing over and off waterproof membrane 46, embodiments of the present invention offer at least two new features. First is drip edge 48. Drip edge 48 is four rails mechanically coupled to one another in a manner somewhat similar to four upper frame bars 16 and four lower frame bars 12. Drip edge 48 is mechanically coupled to four drip edge inner rails 50 which rest upon spacer 80 such that drip edge 48 is slightly staggered outside of waterproof membrane 46 providing a channel for water 92 to travel from waterproof membrane 46. Soil retainer 44 is also placed upon spacer 80 in order to keep soil within soil retainer 44 from leaving drip edge 48. Soil retainer 44 is a hollowed cube that can be formed by connecting four hexahedron members or in a solid piece depending on user preference. In some embodiments, drip edge 48 can be raised above four drip edge inner rails 50 which can eliminate the need for soil retainer 44. Drip edge 48 must be on at least one side of the raised gardening bed, but need not be on every side, for instance if the raised gardening bed is immediately adjacent to another structure. This creates a raised gardening bed.

The raised gardening bed solves at least six problems of the prior art, the raised gardening bed is capable of accommodating a pot, a container or a box which can be used to grow a plant or fungus without requiring the user to bend over to access the pot, the container or the box. Additionally the raised gardening bed solves the inability to channel water in prior art raised gardening beds in all directions. More typically, a water pipe was used to channel water in a single direction. Further, the raised gardening bed can accommodate a plurality of side panels 22 which can be used to house animals or for storage of gardening equipment. Fourth, the removable nature of side panels 22 permits access to any part of the secure storage. Fifth, gravity latch 66 provides a single motion to unlock side panel 22 and easily releases when engaged. The prior art eyebolt latch would be susceptible to jamming. Sixth, as noted below, side panel upper bar can be partially separated from upper frame bar 16 which allows access to the secure storage without permitting animals in the secure storage to escape.

Figure 9:
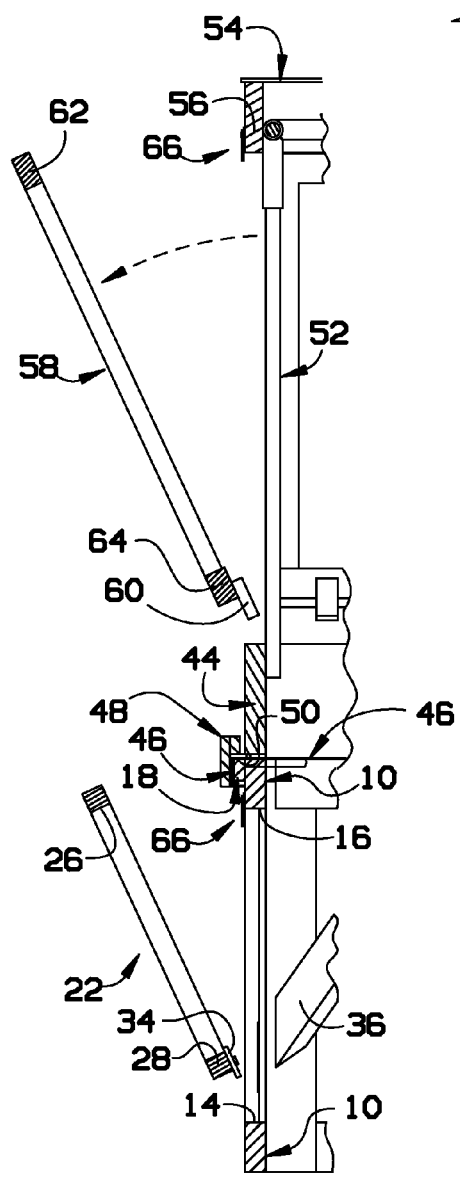
FIG. 9 is a section detail view of an embodiment of the invention demonstrating panel removal.
Figure 10:
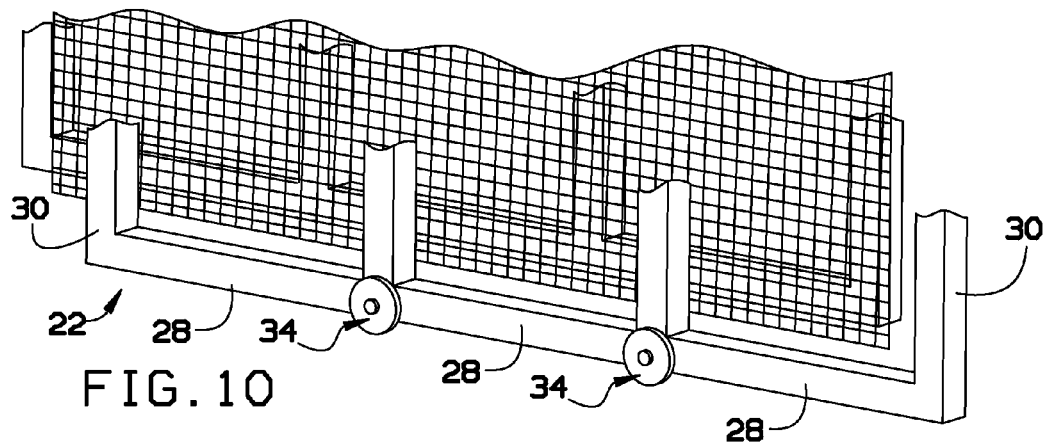
FIG. 10 is a perspective detail view of an embodiment of the screened panel.

Turning to FIG. 9 and FIG. 10, adding secure storage to a raised gardening bed involves inserting panels into enclosure frame 10. Side panel 22 comprises side panel upper bar 26 mechanically coupled to side panel vertical members 30. Side panel vertical members 30 are further mechanically coupled to side panel lower bar 28. Side panel lower bar 28 is mechanically coupled to panel stop 34 which prohibits movement of side panel 22 in one direction. In some embodiments, the direction is moving away from enclosure frame 10, in other embodiments the direction is moving toward enclosure frame 10. In some embodiments, panel stop 34 is mechanically coupled to lower frame bar 14 limiting the outward movement of side panel 22.

To install side panel 22, a user inserts side panel lower bar 28 immediately adjacent to lower frame bar 14 and slides panel stop 34 inside of lower frame bar 14. As the user rotates side panel 22 into place side panel vertical members 30 will slide immediately adjacent to inside legs 12 preventing movement of side panel 22 further into enclosure frame 10.

Figure 4:
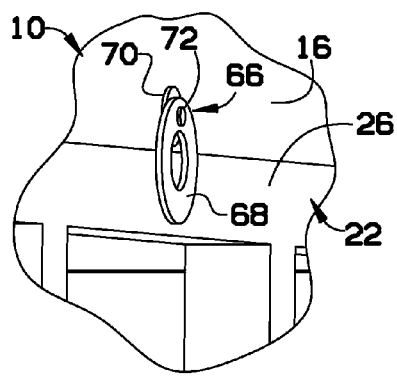
FIG. 4 is a detail perspective view of an embodiment of the invention demonstrating the gravity latch in engaged configuration.
Figure 5:
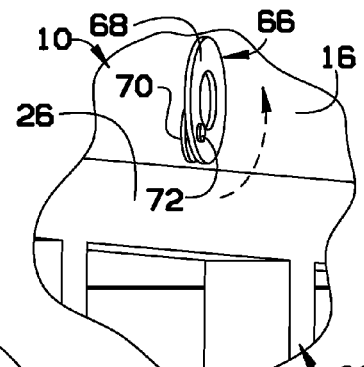
FIG. 5 is a detail perspective view of an embodiment of the invention demonstrating the gravity latch in rotated configuration.
Figure 6:
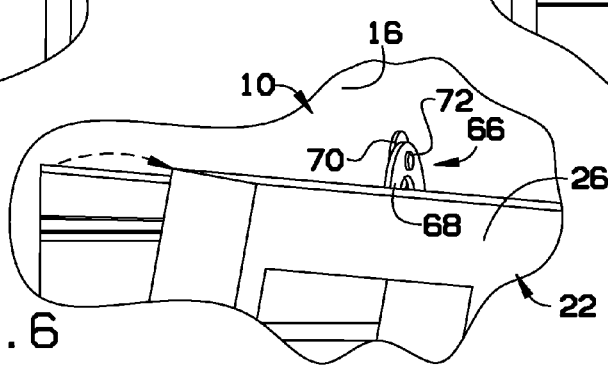
FIG. 6 is a detail perspective view of an embodiment of the invention demonstrating the screened panel in swinging configuration.
Figure 7:
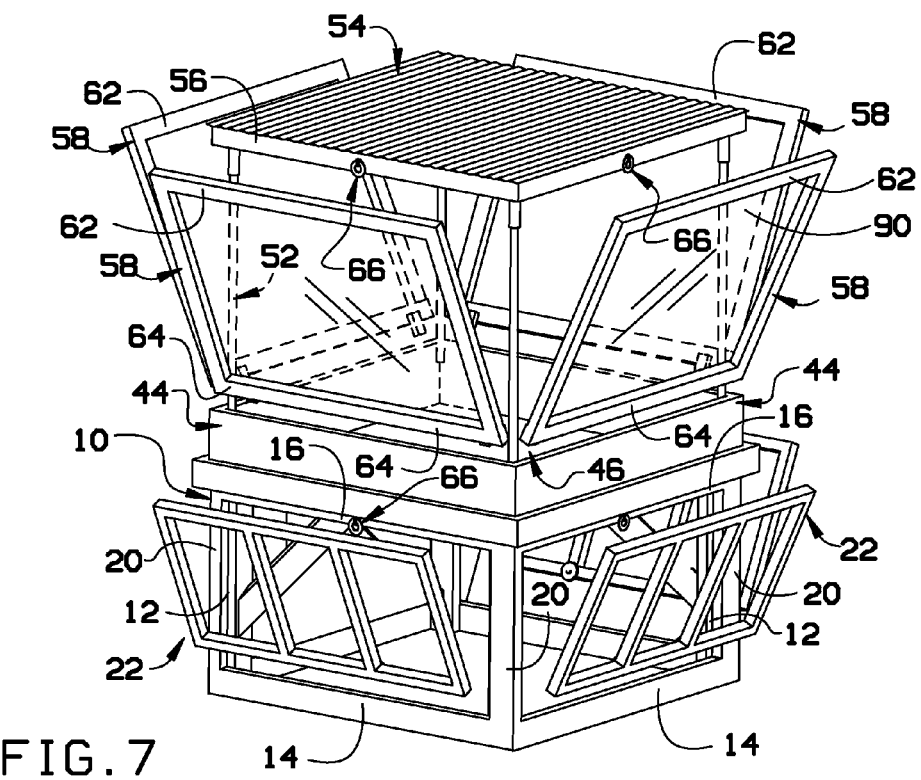
FIG. 7 is a perspective view of an embodiment of the invention demonstrating removal of panels and omitting the screened panel for illustrative clarity.

Movement of side panel 22 outward from enclosure frame 10 can be restricted by gravity latch 66 as shown in FIG. 4, FIG. 5, and FIG. 6. Gravity latch 66 is mechanically coupled to upper frame bar 16. Gravity latch 66 comprises pivot plate 70 mechanically coupled to finger ring 68 with fastener 72. Gravity latch 66 requires a physical test to move finger ring 68 away from side panel upper bar 26 by rotating finger ring 68. This physical test can prevent animals without dexterity to accomplish the physical test from entering the secured storage thus securing the storage.

Returning to FIG. 1, an obstacle can be required to limit access to the secure storage which can include, for example wire mesh 24, solid paneling 74, among others. Wire mesh 24 is useful for keeping vermin out but permitting natural ventilation from wind. In some cases, a user may desire to make a boundary to prevent wind from traveling through one or more sides of the secure storage, and this can be accomplished with solid paneling 74.

In some embodiments, an upper compartment can create a greenhouse effect that can aid a user in growing crops or simply keeping away birds. Returning to FIG. 11, the upper compartment comprises, pole frame 52. Pole frame 52 comprises a rectangle created by four connected members resulting in four corners. Each corner is mechanically coupled to a member orthogonal to the rectangle. In some embodiments the orthogonal members rest parallel to and slightly inside or immediately adjacent to soil retainer 44. The upper compartment cover comprises cover frame 56, which is a rectangle mechanically coupled to truss members 82. Truss members 82 and cover frame 56 can channel rain water away from cover frame 56 and onto soil retainer 44 or drip edge 48, which direct water flow as indicated above.

The upper compartment can accommodate a series of upper compartment panels 58. Upper compartment panel 58 comprises upper compartment lower frame bar 64 mechanically coupled to upper compartment upper frame bar 62 with upper compartment side bars. Upper compartment lower frame bar 64 is mechanically coupled to upper compartment panel stop 60. To install upper compartment panel 58, a user inserts upper compartment lower frame bar 64 immediately adjacent to soil retainer 44 and slides upper compartment panel stop 60 inside of soil retainer 44. As the user rotates upper compartment panel 58 into place upper compartment side bars will slide immediately adjacent to pole frame 52 preventing movement of upper compartment panel 58 further into pole frame 52.

Movement of upper compartment panel 58 outward from pole frame 52 can be restricted by gravity latch 66 as described above. Here, gravity latch 66 is mechanically coupled to cover frame 56. Gravity latch 66 requires a physical test to move finger ring 68 away from upper compartment upper frame bar 62 by rotating finger ring 68. This physical test can prevent animals without dexterity to accomplish the physical test from entering the upper compartment.

A user can configure upper compartment panel 58 to best affect growing in the upper compartment. For instance, upper compartment panel 58 can be filled with greenhouse glazing 90 which can permit sunlight to shine in to assist growing of plants while creating a greenhouse environment trapping heat. Greenhouse glazing 90 can be made from many materials including polycarbonate, acrylic, plastic and so on. In other embodiments, wire mesh 24 can be utilized which can permit the entry of sunlight, but also permit the flow of wind to enable growth of material that requires a cooler environment. In other embodiments, solid paneling 74 can be used to provide shade which can permit fungi to grow.

Figure 12:
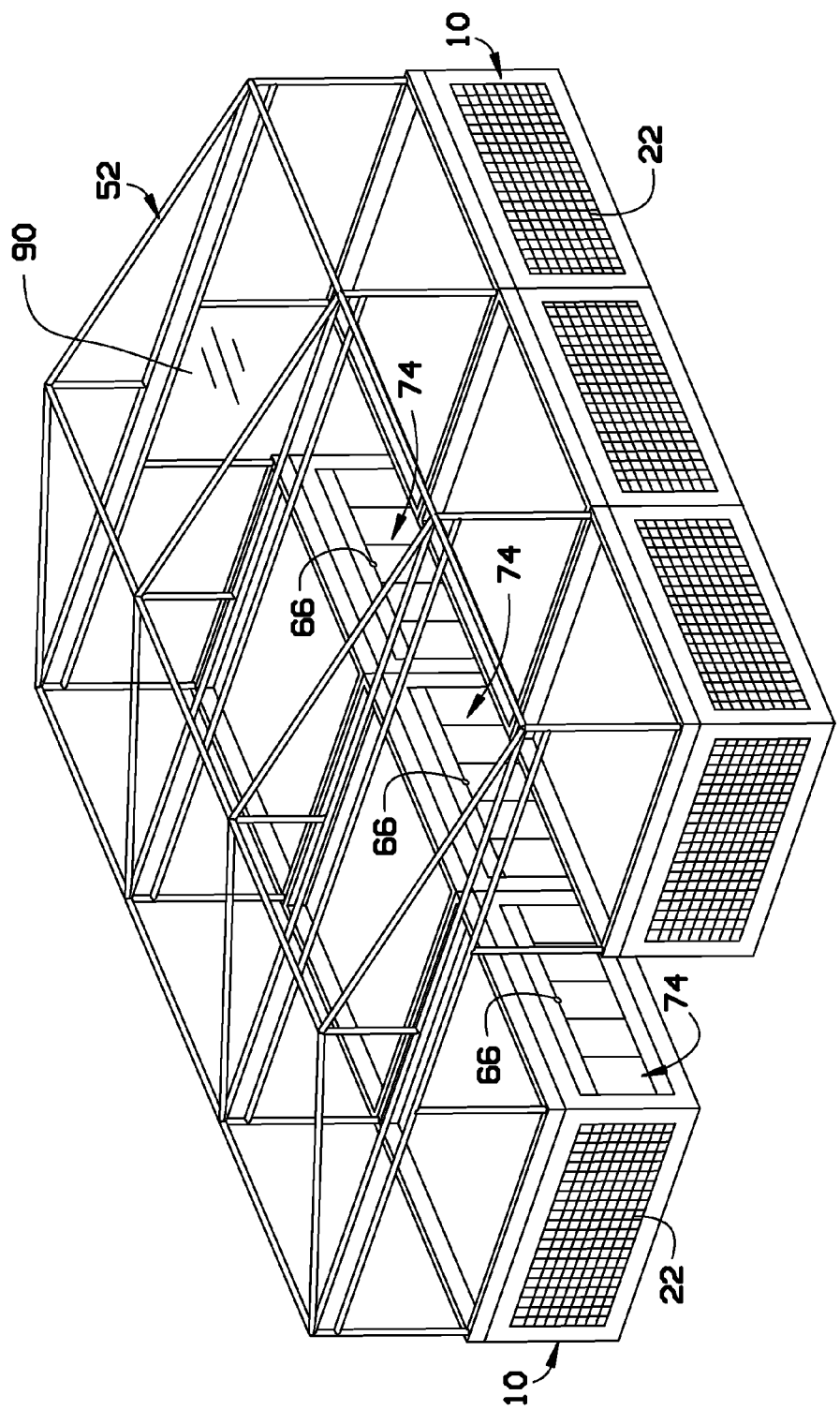
FIG. 12 is a perspective view of an alternate embodiment of the invention omitting multiple components for illustrative clarity.
Figure 13:
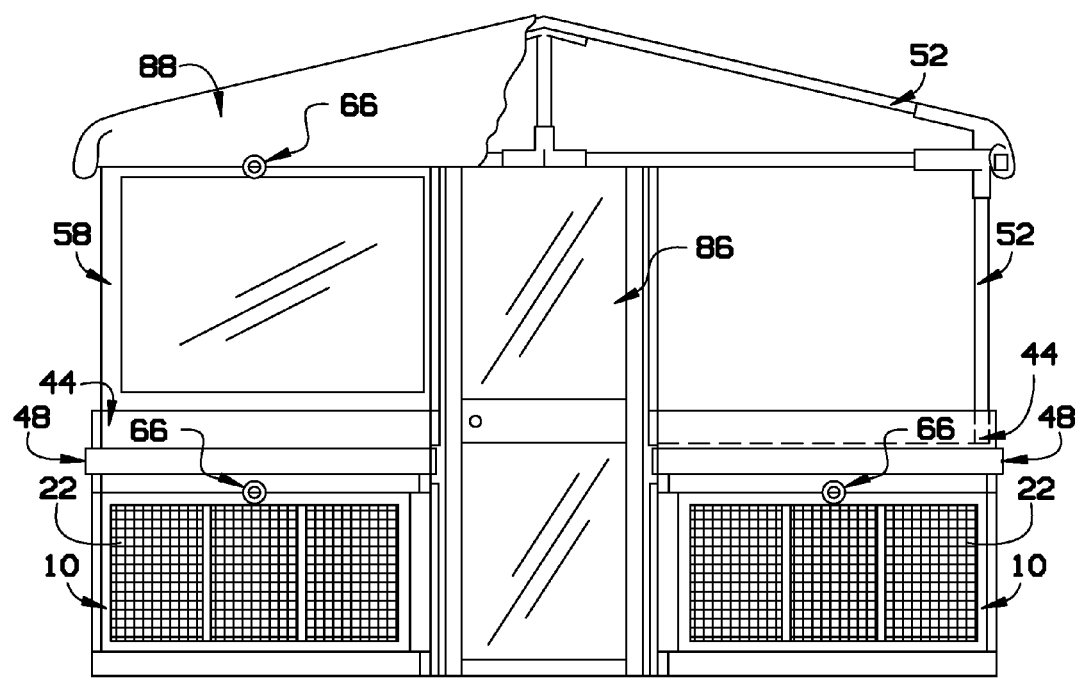
FIG. 13 is a front view of an alternate embodiment of the invention omitting multiple components for illustrative clarity.

As shown in FIG. 12 and FIG. 13 a plurality of enclosure frames 10 can be placed immediately adjacent to one another to form a first row of enclosure frames and a second row of enclosure frames. However, only two enclosure frames 10 are necessary for this. The enclosure frames can then be covered with a pole frame 52 configured to create a truss around the plurality of enclosure frames 10. In this design, particularly if animals are kept in the secure storage it is useful to have the outward facing side panels be wire mesh 22 and the inward facing sides be solid panels 74 in order to keep gasses created by livestock outside of pole frame 52.

A greenhouse can be formed by covering pole frame 52 with plastic covering 88 to prevent water from entering the greenhouse and providing a roof. A user can affix door 86 to pole frame 52 to allow access to an interior portion of the greenhouse. Upper compartment panel 58 can be used as a greenhouse window permitting sunlight to enter the greenhouse as desired by the user.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A modular enclosure to permit gardening and storage, the modular enclosure comprising,
   a raised gardening bed capable of accommodating a pot, a container or a box which can be used to grow a plant or fungus without requiring a user to bend over to access the pot, the container or the box;
   a secure storage arranged within the raised gardening bed that requires a physical test for the user to access the secure storage; and
   a drip edge immediately adjacent to the raised gardening bed which permits water to drain from at least one side of the raised gardening bed;
   an enclosure frame further comprising four lower frame bars arranged in a rectangle and mechanically coupled to four inside legs and four outside legs; the four inside legs and the four outside legs are further mechanically coupled to four upper frame bars;
   side panels are immediately adjacent to the enclosure frame wherein the side panels each further comprise a side panel upper bar mechanically coupled to side panel vertical members; the side panel vertical members are further mechanically coupled to a side panel lower bar; the side panel lower bar is mechanically coupled to a panel stop which prohibits movement of at least one side panel in one direction from the enclosure frame; and
   a gravity latch, attached to one of the upper frame bars, the gravity latch further comprising:
   a pivot plate attached to a finger ring with a fastener; wherein in a first mode of operation the finger ring hangs over the one of the upper frame bars and an adjacent side panel upper bar preventing movement of the adjacent side panel upper bar away from the one of the upper frame bars.

2. The modular enclosure of claim 1,
   the enclosure frame is mechanically coupled to a ledge that extends past the four upper frame bars; and
   a waterproof membrane is placed upon the ledge in order to channel the water from the waterproof membrane off of the ledge.

3. The modular enclosure of claim 1,
   wherein the side panels are replaceable and can be either solid panels, wire panels or a combination or solid panel and wire panels to enable a user to direct airflow.

4. The modular enclosure of claim 1, the side panel vertical members have movement restricted by two of the four inside legs.

5. The modular enclosure of claim 1, wherein: the enclosure frame is mechanically coupled to a ledge that extends past the four upper frame bars;
   a waterproof membrane is placed upon the ledge in order to channel the water from the waterproof membrane off of the ledge;
   a spacer is immediately adjacent to the waterproof membrane; and
   the drip edge is immediately adjacent to the spacer, the drip edge is further comprising four rails mechanically coupled to one another forming a rectangle; each rail is further mechanically coupled to a four drip edge inner rails such that the water can flow past the spacer and is then directed downward by the drip edge.

6. The modular enclosure of claim 1,
   the enclosure frame is mechanically coupled to a ledge that extends past the four upper frame bars;
   a waterproof membrane is placed upon the ledge in order to channel the water from the waterproof membrane off of the ledge;
   a spacer is immediately adjacent to the waterproof membrane;
   the drip edge is immediately adjacent to the spacer, the drip edge is further comprising four rails mechanically coupled to one another forming a rectangle; each rail is further mechanically coupled to a four drip edge inner rails such that the water can flow past the spacer and is then directed downward by the drip edge; and
   a soil retainer is placed on top of the spacer to prevent soil from flowing past the drip edge.

7. The modular enclosure of claim 1,
   wherein the raised gardening bed further comprises an upper compartment,
   the enclosure frame is mechanically coupled to a ledge that extends past the four upper frame bars;
   a waterproof membrane is placed upon the ledge in order to channel the water from the waterproof membrane off of the ledge;
   a spacer is immediately adjacent to the waterproof membrane;
   the drip edge is immediately adjacent to the spacer, the drip edge is further comprising four rails mechanically coupled to one another forming a rectangle; each rail is further mechanically coupled to a four drip edge inner rails such that the water can flow past the spacer and is then directed downward by the drip edge; and
   a soil retainer is placed on top of the spacer to prevent soil from flowing past the drip edge;
   the upper compartment further comprising,
   a pole frame further comprising a rectangle created by four connected members resulting in four corners; each corner is mechanically coupled to a member orthogonal to the rectangle; wherein the orthogonal members are immediately adjacent to the soil retainer;
   the pole frame is further connected to truss members wherein the truss members are mechanically coupled to a cover frame such that the truss members and the cover frame can channel the water away from the cover frame.

8. The modular enclosure of claim 1,
   wherein the raised gardening bed further comprises an upper compartment,
   the enclosure frame is mechanically coupled to a ledge that extends past the four upper frame bars;
   a waterproof membrane is placed upon the ledge in order to channel the water from the waterproof membrane off of the ledge;
   a spacer is immediately adjacent to the waterproof membrane;
   the drip edge is immediately adjacent to the spacer, the drip edge is further comprising four rails mechanically coupled to one another forming a rectangle; each rail is further mechanically coupled to a four drip edge inner rails such that the water can flow past the spacer and is then directed downward by the drip edge; and
   a soil retainer is placed on top of the spacer to prevent soil from flowing past the drip edge;
   the upper compartment further comprising,
   a pole frame further comprising a rectangle created by four connected members resulting in four corners; each corner is mechanically coupled to a member orthogonal to the rectangle;
   wherein the orthogonal members are immediately adjacent to the soil retainer;
   the pole frame is further connected to truss members wherein the truss members are mechanically coupled to a cover frame such that the truss members and the cover frame can channel the water away from the cover frame; and
   the pole frame accommodating a plurality of greenhouse glaze panels to increase heat in the upper compartment.

9. A greenhouse to grow plants and house animals which keeps the plants warm and the animals cool, the greenhouse comprising,
   two raised gardening beds; each raised gardening bed further comprising,
      a raised gardening bed capable of accommodating a pot, a container or a box which can be used to grow a plant or fungus without requiring a user to bend over to access the pot, the container or the box;
      a secure storage mechanically coupled to the raised gardening bed that requires a physical test for the user to access the secure storage; and
      a drip edge immediately adjacent to the raised gardening bed which permits water to drain from at least one side of the raised gardening bed;
      an enclosure frame further comprising four lower frame bars arranged in a rectangle and mechanically coupled to four inside legs and four outside legs; the four inside legs and the four outside legs are further mechanically coupled to four upper frame bars;
      side panels are immediately adjacent to the enclosure frame wherein the side panels further comprise a side panel upper bar mechanically coupled to side panel vertical members; the side panel vertical members are further mechanically coupled to a side panel lower bar; the side panel lower bar is mechanically coupled to a panel stop which prohibits movement of the side panel in one direction from the enclosure frame; and
      a gravity latch, attached to one of the upper frame bars, the gravity latch further comprising:
         a pivot plate attached to a finger ring with a fastener; wherein in a first mode of operation the finger ring hangs over the one of the upper frame bars and an adjacent side panel upper bar preventing movement of the adjacent side panel upper bar away from the one of the upper frame bars
   outward facing side panels are wire mesh permitting air to flow through the side panels and to cool animals therein;
   inward facing sides are solid panels in order to keep heat from leaving the greenhouse through the side panels;

a pole frame on top of the raised gardening beds forming a truss structure and a series of upper panels; the upper panels can be greenhouse glazing to keep the heat inside the greenhouse to encourage plant growth; and a door is mechanically coupled to the pole frame to permit entry to the greenhouse.

10. The greenhouse of claim 9, further comprising; a soil retainer placed on top of the spacer to prevent soil from flowing past the drip edge.

11. A modular enclosure to permit gardening and storage, the modular enclosure comprising, a raised gardening bed capable of accommodating a pot, a container or a box which can be used to grow a plant or fungus without requiring a user to bend over to access the pot, the container or the box;

a secure storage arranged within to the raised gardening bed that requires a physical test for the user to access the secure storage; and a drip edge immediately adjacent to the raised gardening bed which permits water to drain from at least one side of the raised gardening bed;

an enclosure frame further comprising four lower frame bars arranged in a rectangle and mechanically coupled to four inside legs and four outside legs; the four inside legs and the four outside legs are further mechanically coupled to four upper frame bars;

the enclosure frame is mechanically coupled to a ledge that extends past the four upper frame bars;

a waterproof membrane is placed upon the ledge in order to channel the water from the waterproof membrane off of the ledge;

a spacer is immediately adjacent to the waterproof membrane; and the drip edge is immediately adjacent to the spacer, the drip edge is further comprising four rails mechanically coupled to one another forming a rectangle; each rail is further mechanically coupled to one of four drip edge inner rails such that the water can flow past the spacer and is then directed downward by the drip edge.

12. The modular enclosure of claim 11, further comprising: a soil retainer is placed on top of the spacer to prevent soil from flowing past the drip edge.

13. The modular enclosure of claim 12, wherein the upper compartment further comprises, a pole frame further comprising a rectangle created by four connected members resulting in four corners; each corner is mechanically coupled to a member orthogonal to the rectangle; wherein the orthogonal members are immediately adjacent to the soil retainer;

the pole frame is further connected truss members wherein the truss members are mechanically coupled to a cover frame such that the truss members and the cover frame can channel the water away from the cover frame.

14. The modular enclosure of claim 13, further comprising, a plurality of greenhouse glaze panels attached to the pole frame to increase heat in the upper compartment.

15. A greenhouse to grow plants and house animals which keeps the plants warm and the animals cool, the greenhouse comprising, two raised gardening beds; each raised gardening bed further comprising, a raised gardening bed capable of accommodating a pot, a container or a box which can be used to grow a plant or fungus without requiring a user to bend over to access the pot, the container or the box;

a secure storage arranged within to the raised gardening bed that requires a physical test for the user to access the secure storage; and a drip edge immediately adjacent to the raised gardening bed which permits water to drain from at least one side of the raised gardening bed;

an enclosure frame further comprising four lower frame bars arranged in a rectangle and mechanically coupled to four inside legs and four outside legs; the four inside legs and the four outside legs are further mechanically coupled to four upper frame bars;

the enclosure frame is mechanically coupled to a ledge that extends past the four upper frame bars;

a waterproof membrane is placed upon the ledge in order to channel the water from the waterproof membrane off of the ledge;

a spacer is immediately adjacent to the waterproof membrane; and the drip edge is immediately adjacent to the spacer, the drip edge is further comprising four rails mechanically coupled to one another forming a rectangle; each rail is further mechanically coupled to one of four drip edge inner rails such that the water can flow past the spacer and is then directed downward by the drip edge;

outward facing side panels are wire mesh permitting air to flow through the side panels and to cool animals therein; inward facing sides are solid panels in order to keep heat from leaving the greenhouse through the side panels;

a pole frame on top of the raised gardening beds forming a truss structure and a series of upper panels; the upper panels can be greenhouse glazing to keep the heat inside the greenhouse to encourage plant growth; and a door is mechanically coupled to the pole frame to permit entry to the greenhouse.

16. The greenhouse of claim 15, further comprising; a soil retainer placed on top of the spacer to prevent soil from flowing past the drip edge.

* * * * *